(12) United States Patent
Soni et al.

(10) Patent No.: US 11,386,474 B2
(45) Date of Patent: Jul. 12, 2022

(54) SYSTEM AND METHOD FOR GENERATING A PRODUCT RECOMMENDATION IN A VIRTUAL TRY-ON SESSION

(71) Applicant: Rovi Guides, Inc., San Jose, CA (US)

(72) Inventors: Chirag Soni, Himachal Pradesh (IN); Prajjwal Agarwal, Uttar Pradesh (IN); Ganga Vara Prasad Miriam, Ongole (IN); Madhusudhan Srinivasan, Bangalore (IN); Ramesh Alagarsamy, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 183 days.

(21) Appl. No.: 16/155,270

(22) Filed: Oct. 9, 2018

(65) Prior Publication Data
US 2020/0111148 A1 Apr. 9, 2020

(51) Int. Cl.
*G06Q 30/06* (2012.01)
(52) U.S. Cl.
CPC ..... *G06Q 30/0631* (2013.01); *G06Q 30/0643* (2013.01)
(58) Field of Classification Search
CPC . G06Q 30/0601–0645; G06Q 30/0631; G06Q 30/0643
USPC ..................... 705/26.1–27.2, 26.7
See application file for complete search history.

(56) References Cited

U.S. PATENT DOCUMENTS

| | | | |
|---|---|---|---|
| 10,091,554 B1 * | 10/2018 | Newell | A61B 5/6803 |
| 2008/0250323 A1 | 10/2008 | Huff | |
| 2014/0365272 A1 * | 12/2014 | Hurewitz | G06Q 30/0201 705/7.29 |
| 2016/0127710 A1 * | 5/2016 | Saban | G06T 11/00 386/241 |
| 2017/0278172 A1 * | 9/2017 | Dey | G06Q 30/0633 |
| 2017/0372504 A1 * | 12/2017 | Jang | G06T 19/006 |
| 2018/0047192 A1 * | 2/2018 | Kristal | G06Q 30/0643 |
| 2018/0253196 A1 * | 9/2018 | Hu | G06F 3/011 |
| 2019/0043493 A1 * | 2/2019 | Mohajer | G10L 15/1822 |
| 2019/0188784 A1 * | 6/2019 | Bleicher | G06K 9/00362 |
| 2019/0378204 A1 * | 12/2019 | Ayush | G06Q 99/00 |

OTHER PUBLICATIONS

Crowe, Kelly. Marketers Exploiting Secrets of the Living Brain. Jan. 1, 2013. Accessed Via https://www.cbc.ca/news/health/marketers-exploiting-secrets-of-the-living-brain-1.1273976 (Year: 2013).*

(Continued)

*Primary Examiner* — Allison G Wood
(74) *Attorney, Agent, or Firm* — Haley Guiliano LLP (57) ABSTRACT

System and methods for generating a product recommendation based on reactions such as bio-feedback of a subject during a virtual try-on session are described herein. A recommendation engine captures bio-feedback and determines whether the subject has a positive or negative attitude towards a certain feature of a product that is being virtually "tried on" with the subject. The recommendation engine can then provide a product recommendation based on the actual sentiment of the subject towards a product feature.

20 Claims, 7 Drawing Sheets

(56) References Cited

OTHER PUBLICATIONS

Monks, Kieron. Feeling Glum, Happy, Aroused? New Technology Can Detect Your Mood. Published Feb. 6, 2014. Published by CNN Business. Accessed via https://www.cnn.com/2014/02/04/tech/innovation/this-new-tech-can-detect-your-mood/index.html (Year: 2014).*

PCT International Search Report and Written Opinion for International Application No. PCT/US2019/055477, dated Mar. 19, 2020 (16 pages).

Adnan et al., "Evaluation of Graceful Movement in Virtual Fitting through Expressed Emotional Response and Emotion Expressed via Physiology Measures," European Conference on Computer Vision, pp. 788-797 (2012).

\* cited by examiner

SYSTEM AND METHOD FOR GENERATING A PRODUCT RECOMMENDATION IN A VIRTUAL TRY-ON SESSION

BACKGROUND

The present disclosure is directed to product recommendations, and more particularly to generating product recommendations based on bio-feedback from a subject during a virtual try-on session.

SUMMARY

Existing recommendation engines provide product recommendations based on preferences derived from deliberate and intended user inputs such as, for example, search terms, expressed preferences, purchases, product viewings, or the like. Recommendations generated from such systems are often inaccurate because such systems cannot capture user sentiments associated with a product, or its particular features, that are not part of such inputs. For example, a user may enter the search query "green apron". After seeing a search result (e.g., an image), the user may like the product but not its particular shade of green. Current recommendation engines cannot capture the user's reaction and learn about the preference until it is reflected in the user's inputs.

To solve the problem and provide more accurate recommendations, systems and methods are disclosed herein for generating product recommendations based on bio-feedback of a subject captured during a virtual try-on session. As described below, a recommendation engine is implemented at user equipment or a server to generate a recommendation based on bio-feedback captured from a subject during the subject's interaction with the virtual try-on session. The virtual try-on session is a simulated visualization illustrating the subject trying on a product.

The recommendation engine captures bio-feedback such as the subject's focal point, the subject's line of sight, facial expressions, verbal expressions, gestures, movements, biometric measurements, and/or the like of the subject, to determine what feature of the product the user is paying attention to, and whether the user likes, or dislikes the particular feature of the product.

In some embodiments, the bio-feedback includes biometric measurements such as the pulse rate, blood pressure, pupil dilation, and/or the like. The recommendation engine determines a change of a biometric parameter from the biometric measurement and queries a biometric database based on the change of the biometric parameter to identify the emotion that is implied by the change of the biometric parameter.

In some embodiments, the bio-feedback includes a facial expression, a gesture or a body movement of the subject, and/or the like. The recommendation engine captures an image or video of a subject's movement (including facial movement) and generates a movement pattern or facial expression pattern from the captured image or video content. The recommendation engine then uses the pattern to identify the movement or facial expression, and then identifies an emotion associated with the identified movement.

Based on the particular feature and the identified emotion, the recommendation engine recommends a product having the same particular product feature if the bio-feedback shows positive emotion, or avoids recommending products having the same feature if the bio-feedback shows negative emotion. In this way, the recommendation engine improves computer-assisted shopping experience by providing more accurate and more efficient product recommendations that captures the actual sentiment of a subject towards a particular product feature during a virtual try-on experience.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
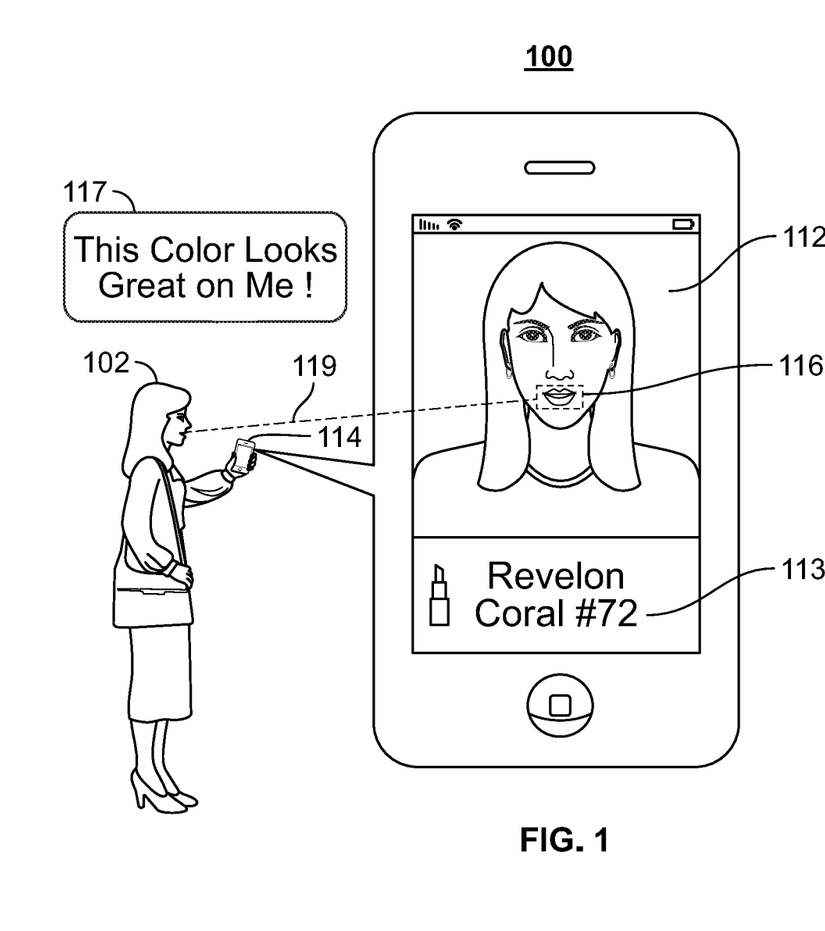
FIG. 1 depicts an illustrative embodiment illustrating aspects of a subject interacting with a simulated visualization of a virtual try-on of a product, according to some embodiments described herein.

FIG. 1 depicts an illustrative embodiment illustrating aspects of a subject interacting with a simulated visualization of a virtual try-on of a product, according to some embodiments described herein. Diagram 100 shows a subject 102, which is a human user in this example, operating user equipment 114, on which a simulated visualization 112 of a virtual try-on of a product, e.g., lipstick product "Revlon Coral" 113, is being presented. The user equipment 114 may be a personal computer (PC), a laptop computer, a tablet computer, a hand-held computer, a stationary telephone, a personal digital assistant (PDA), a mobile telephone, a smart phone, an intelligent wearable device, or any other smart equipment, computing equipment, or wireless device, and/or combination of the same. In some embodiments, the user equipment 114 may have a front facing screen and a rear facing screen, multiple front screens, or multiple angled screens. In some embodiments, the user equipment 114 may have a front facing camera and/or a rear facing camera. In some embodiments, the user equipment 114 may have an audio recorder. In some embodiments, the user equipment 114 may have various sensors including a gyroscope and/or an accelerometer. In some embodiments, the user equipment 114 may be equipped with, or may receive data from a wearable device that is capable of biometric measurement including measuring the pulse rate, heart rate, body temperature, blood pressure, and/or the like.

An enlarged view of the screen of user equipment 114 is shown at 112, which illustrates a simulated visualization of a human headshot. The lip area 116 of the human face has been accentuated with a lipstick color corresponding to the lipstick product 113, creating a virtual experience that the lipstick product "Revlon Coral" 113 is being "tried" by a subject relating to the human headshot.

Specifically, a recommendation engine, implemented at user equipment 114, may generate the simulated visualization 112 to illustrate a visual try-on experience. For example, the subject 102 may select the lipstick product 113 and submit an image or a video of the subject (e.g., an image of the subject 102 herself or another human user, etc.) for the lipstick product 113 to be tried on.

In some embodiments, the recommendation engine may determine a type of the product, e.g., beauty products for the lipstick 113, from which the recommendation engine determines that an image or video showing the facial area of a human body is to be used. The recommendation engine may optionally generate for display, on the user equipment 114, instructions for the subject 102 to capture or submit a photo showing the facial area of a human body. Or alternatively, the recommendation engine may optionally adjust a submitted photo to focus on the facial area of a human body, e.g., by cropping a submitted image showing a full human body of the subject 102 to concentrate on the facial area of the subject 102.

Figure 3:
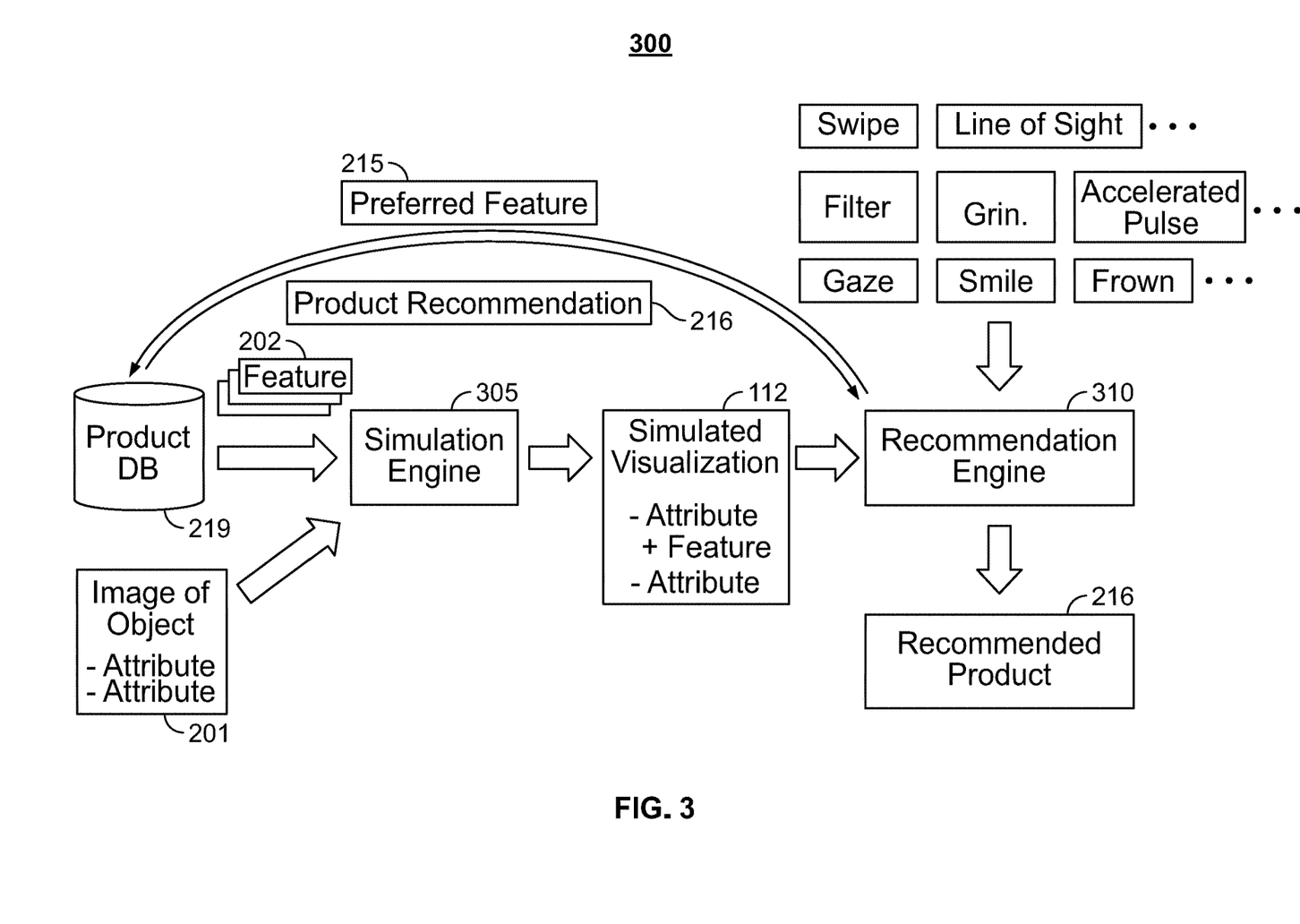
FIG. 3 depicts an example block diagram illustrating the exchange of data artifacts between a simulation engine, the product and various databases to generate a product recommendation as described in FIG. 2, according to some embodiments described herein.

The recommendation engine may then identify the product feature of the lipstick product 113, e.g., the lipstick color, from a product database (e.g., see 219 described in FIG. 3). The recommendation engine then identifies the lip area 116 of the human face in the submitted (or adjusted) image or video, and change the original color of the lip area 116 to the lipstick color "coral" corresponding to the lipstick product "Revlon Coral" 113. In this way, the recommendation engine generates a simulated visualization 112 that shows a human face having the lip area 116 virtually painted "coral" by the lipstick product 113.

In some embodiments, the subject 102 may submit a video of the subject (e.g., a human body) to generate a dynamic view of the virtual try-on. The recommendation engine may generate a number of video frames from the video of the subject. For each video frame showing the facial area of the human body, the recommendation engine may modify the color of the lip area to the lipstick color as described above. In this way, the recommendation engine may generate a video simulating a dynamic view of the human face having the lip area 116 virtually painted by the lipstick product 113.

In some embodiments, instead of retrieving the product features from a database and generating the simulated visualization 112, the recommendation engine at user equipment 114 may receive, from another application on the user equipment, another user equipment, a remote data source, and/or the like, the simulated visualization 112 in the form of a composite image or video content for display via a user interface. In this case, the recommendation engine may retrieve a content structure associated with the simulated visualization 112, which includes structural data attributes. For example, the structural data attributes include a data structure for the lip area and attributes indicative of the current color "coral" of the lip area 116. The recommendation engine may then determine whether the color attribute of the lip area 116 has been modified based on metadata associated with the simulated visualization 112. In this way, if a modification of the color attribute is shown in the modification history of the simulated content, the recommendation engine may identify that the current color "coral" of the lip area 116 relates to a product feature imposed on the original image for virtual try-on experience.

Upon identifying the product feature of "coral" color, the recommendation engine may detect an interaction from subject 102 with the simulated visualization 112. As referred to herein, the term "interaction" refers to an action of a subject intended by the subject to be an express input to the system implementing the recommendation engine. For example, subject 102 may operate the user equipment 114 to move to the center of the screen, or enlarge a portion of the simulated visualization 112 so that the subject 102 can concentrate on the lip area 116. For another example, subject 102 may modify the simulated visualization 112 by change a color tone, contrast, brightness, saturation, and/or the like of the simulated visualization 112.

The recommendation engine may capture bio-feedback from the subject 102. As referred to herein, the term "bio-feedback" refers to sensed biological functions of the subject from which the subject's attention or sentiment may be identified. Such biological functions are sensed by a system using appropriate sensors and are not provided by the subject to the system as an intended and deliberate input to the system. For example, bio-feedback can be any of a focal point, a line of sight, facial expression, an utterance, a body movement, a gesture, a pose, biometrics (e.g., blood pressure, pulse rate, heart rate, pupil dilation, electroencephalogram (EEG), body temperature, and/or the like), and/or the like.

For example, the recommendation engine may engage a camera on the user equipment 114 to detect that a focal point or a line of sight 119 of the subject 102 is directed to the lip area 116 in the simulated visualization 112. For another example, the recommendation engine may engage a camera with the user equipment 114 to capture an image or video of the subject 102 showing a facial expression, a movement, a gesture, an utterance of the subject 102. For another example, the recommendation engine may engage an audio recorder at user equipment 114 to record an audio clip of the subject making an utterance. For another example, the recommendation engine may engage a gyroscope sensor and/or an accelerometer at the user equipment 114 to capture a movement of the subject 102. For another example, the recommendation engine may obtain biometrics measurement from a device (e.g., a wristband, a headband, or any wearable device, etc.) in contact with the subject 102, such as a pulse rate, a heart rate, a blood pressure, body temperature, electroencephalogram (EEG), and/or the like.

As shown in diagram 100, the subject 102 may contemplate (with or without a verbal expression) "this color looks great on me" 117, and the mental state may be reflected in a smiling facial expression. The recommendation engine may capture the changed facial expression, and determines the facial expression as "smile," which exhibits a positive attitude from the subject 102. Thus, the recommendation engine may correlate the gaze 119 directed to the lip area 116 being painted with the lip color "coral" with the positive sentiment shown from the facial expression of the subject 102. The recommendation engine may determine that the lip color "coral" is favored by subject 102.

Figure 2:
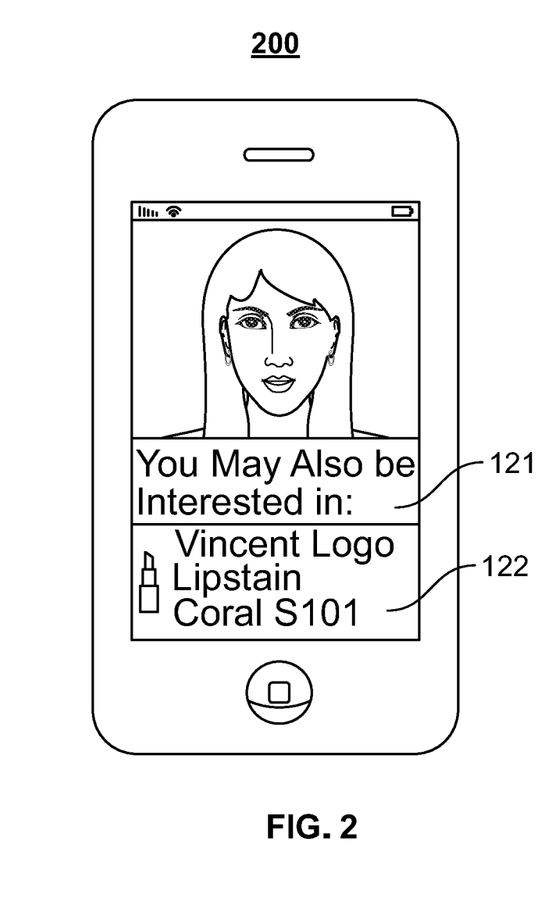
FIG. 2 depicts an illustrative embodiment illustrating aspects of providing a product recommendation based on bio-feedback captured from subject interactions with the simulated visualization described in FIG. 1, according to some embodiments described herein.

FIG. 2 depicts an illustrative embodiment illustrating aspects of providing a product recommendation based on bio-feedback captured from subject interactions with the simulated visualization described in FIG. 1, according to some embodiments described herein. Diagram 200 shows an example screen of user equipment 114, which illustrates a product recommendation 121 of another lipstick product "Vincent Logo lip stain coral" 122 which has a similar color "coral" with the product "Revlon coral" 113 that has been virtually tried on. As diagram 100 illustrates that the subject 102 exhibits a positive emotion towards the lipstick color "coral" during the virtual try-on, the recommendation engine generates another product 122 having a similar product feature, e.g., the color "coral" to the subject 102.

In another example, the subject 102 may interact with the visualization 112 by changing the color tone of the visualization 112. The recommendation engine may capture a "smiling" facial expression reflecting the positive sentiment 117 after the color tone of the visualization 112 has been changed, and may then determine that the positive attitude from the subject 102 is related to the changed color tone, e.g., a lighter lip color. Therefore, the recommendation engine may provide a product recommendation of another lipstick product having the lighter color.

FIG. 3 depicts an example block diagram illustrating the exchange of data artifacts between a simulation engine, the product and various databases to generate a product recommendation as described in FIG. 2, according to some embodiments described herein. Diagram 300 shows a product database 219, a simulation engine 305, a recommendation engine 310, and/or other entities interact with each other to exchange various data messages, artifacts, and/or the like.

In some embodiments, the product database 219 may be housed at an electronic storage device located remotely from the simulation engine 305 or the recommendation engine 310, and may be accessible via a communication network. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The product databases 219 may also be accessed at a cloud-based storage, which may be used to supplement a local storage device or instead of the storage device. Product information may be stored at the product database 219 in a structural format, including a listing of data fields describing attributes of the product such as a product ID, product brand name, category, type, make and model, color, shape, ingredients, retail price, and/or the like.

In some embodiments, the simulation engine 305 or the recommendation engine 310 may be implemented at different devices and may communicate with each other via a communication network. Or alternatively, the simulation engine 305 or the recommendation engine 310 may be integrated into one application running on the same device, e.g., user equipment 114 in FIG. 1. Any of the simulation engine 305 or the recommendation engine 310 (referred to jointly, separately or interchangeably as the recommendation engine described throughout the disclosure) may be implemented using any suitable architecture. For example, any of the simulation engine 305 or the recommendation engine 310 may be a stand-alone application wholly-implemented on user equipment device. In such an approach, instructions of the simulation engine 305 or the recommendation engine 310 are stored locally (e.g., at storage of the user equipment 114 in FIG. 1 but communicate with a remote product databases 219 in FIG. 3), and data for use by the engine is downloaded on a periodic basis (e.g., from an out-of-band feed, from an Internet resource such as the product database 219 in FIG. 3, or using another suitable approach). Control circuitry may be used to retrieve instructions of simulation engine 305 or the recommendation engine 310 from storage and process the instructions to generate any of the displays discussed herein such as the simulated visualization 112 displayed at a user interface on the user equipment 114. Based on the processed instructions, control circuitry may determine what action to perform when input is received from input interface, e.g., a touch screen of user equipment 114. For example, movement of a fingertip on a touch screen up/down may be indicated by the processed instructions when the input interface indicates that an up/down motion is detected.

In some embodiments, the simulation engine 305 or the recommendation engine 310 is a client-server based application. Data for use by a thick or thin client implemented on user equipment device is retrieved on-demand by issuing requests to a server remote to the user equipment device. In one example of a client-server based simulation engine 305 or the recommendation engine 310, control circuitry runs a web browser that interprets web pages provided by a remote server. For example, the remote server may store the instructions for the application in a storage device.

In some embodiments, the simulation engine 305 or the recommendation engine 310 is downloaded and interpreted or otherwise run by an interpreter or virtual machine (run by control circuitry). In some embodiments, the simulation engine 305 or the recommendation engine 310 may be encoded in the ETV Binary Interchange Format (EBIF), received by control circuitry as part of a suitable feed, and interpreted by a user agent running on control circuitry. For example, the simulation engine 305 or the recommendation engine 310 may include an EBIF application. In some embodiments, the simulation engine 305 or the recommendation engine 310 may be defined by a series of JAVA-based files that are received and run by a local virtual machine or other suitable middleware executed by control circuitry running on user equipment 114. In some of such embodiments (e.g., those employing MPEG-2 or other digital media encoding schemes), the simulation engine 305 or the recommendation engine 310 may be, for example, encoded and transmitted in an MPEG-2 object carousel with the MPEG audio and video packets of a program.

The simulation engine 305 or the recommendation engine 310 for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The simulation engine 305 is configured to receive product features 202 from the product databases 219, e.g., via a communication network, and an image or video of a subject 201, e.g., via a user interface on user equipment 114. The simulation engine 305 is then configured to generate a simulated visualization, which is presented for display via a user interface at user equipment, e.g., as shown at 112 in FIG. 1. For example, the simulated visualization 112 includes one or more attributes in the submitted image 201 being modified with the product feature 202. The process of generating a simulated visualization 112 is further described in relation to FIG. 5.

The recommendation engine 310 is configured to monitor any interaction and bio-feedback from a subject 102 when the simulated visualization 112 is presented at the user interface on user equipment 114. Interactive activities such as a swipe, adding a filter, a zoom-in action directed to a portion of the simulated visualization, and bio-feedback such as an accelerated pulse rate, a smile, a frown, and/or the like, are captured by the recommendation engine 310 to determine an emotion indicator of the subject 102. The recommendation engine 310 is configured to associate an interactive activity with at least one form of subsequent or simultaneous bio-feedback to determine an emotion indicator of the subject 102, as further described in FIGS. 6-7. When the emotion indicator shows a positive attitude, e.g., via a positive facial expression, an utterance with a positive tone or words, a gesture showing satisfaction, etc., the recommendation engine 310 determines the product feature 202 that the subject 102 is paying attention to and triggers the bio-feedback as a preferred feature 215. The recommendation engine 310 may then transmit a query based on the preferred feature 215 to the product database 219 for a product recommendation 216. For example, as shown in FIG. 1, the queried product recommendation of "Vincent Logo Lip stain Coral" 122 has the preferred feature of the color "coral" determined from the virtual try-on visualization 112 of the product "Revlon Coral" 133.

FIGS. 4-7 provide example flowcharts illustrating various processes implemented by the recommendation engine as discussed throughout the disclosure, and specifically the simulation engine 305 or the recommendation engine 310 described in FIG. 3. Processes 400-700 may be executed by control circuitry (e.g., control circuity that is configured to control, instruct or implement the simulation engine 305 or the recommendation engine 310 described in FIG. 3). Control circuitry may be part of user equipment 114, or of a remote server separated from the user equipment by way of a communications network. Specifically, control circuitry may be based on any suitable processing circuitry, and comprises control circuits and memory circuits which may be disposed on a single integrated circuit, or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

Figure 4:
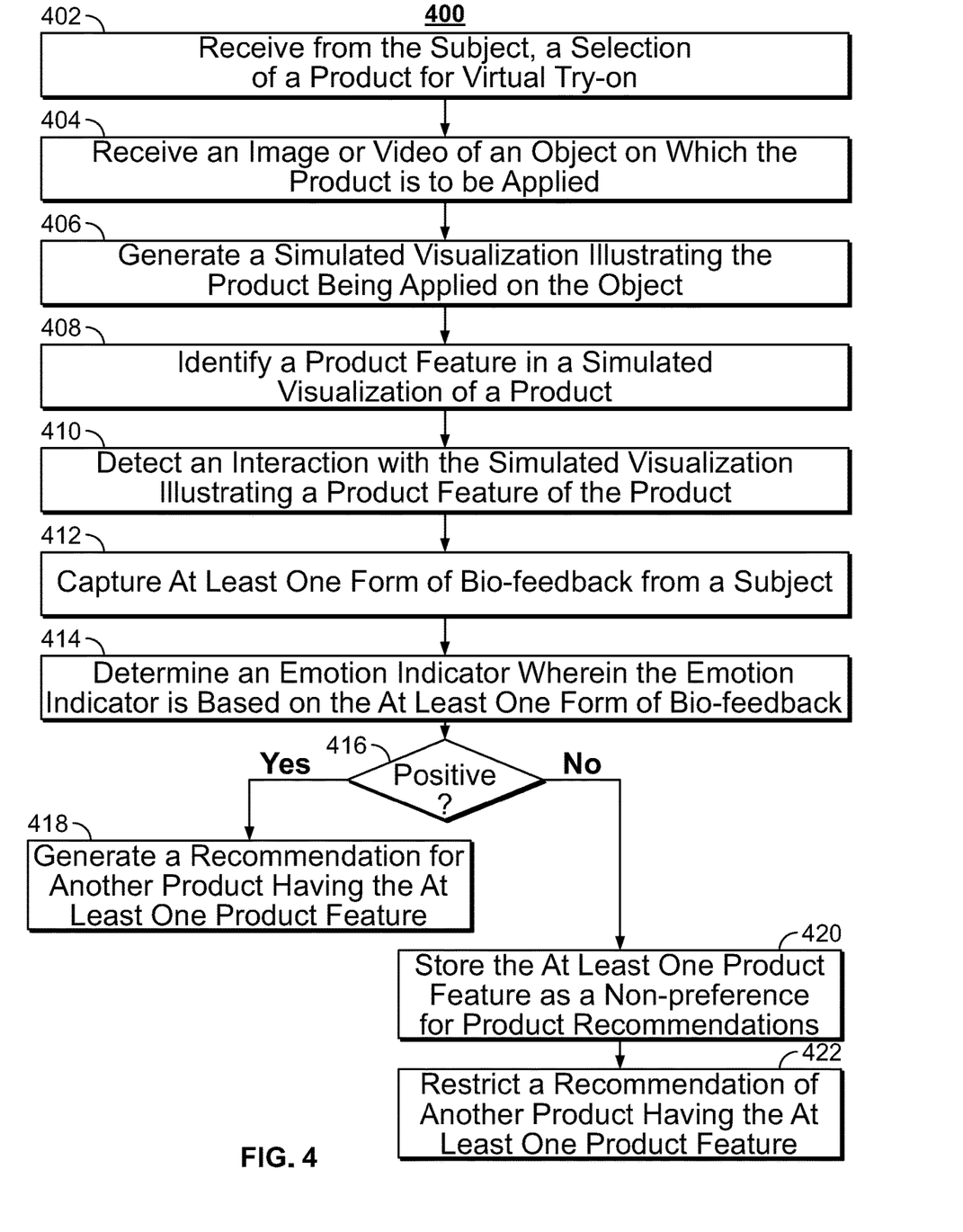
FIG. 4 depicts an illustrative flowchart of a process for generating a product recommendation based on bio-feedback during a virtual try-on session, in accordance with some embodiments of the disclosure.

FIG. 4 depicts an illustrative flowchart of a process for generating a product recommendation based on bio-feedback during a virtual try-on session, in accordance with some embodiments of the disclosure. Process 400 begins at 402, where control circuitry receives, from the subject (e.g., 102 in FIG. 1), a selection of a product (e.g., "Revlon Coral" 113 in FIG. 1) for virtual try-on. At 404, control circuitry receives an image or video of the subject (e.g., 201 in FIG. 3) on which the product is to be applied. For example, control circuitry of user equipment 114 causes a camera on the user equipment 114 to capture an image of the subject, e.g., the subject 102 herself. For another example, control circuitry obtains, via a communication interface, an image via a communication message such as but not limited to an electronic mail, text message, Internet instant message, downloading from an Internet source, and/or the like.

Figure 5:
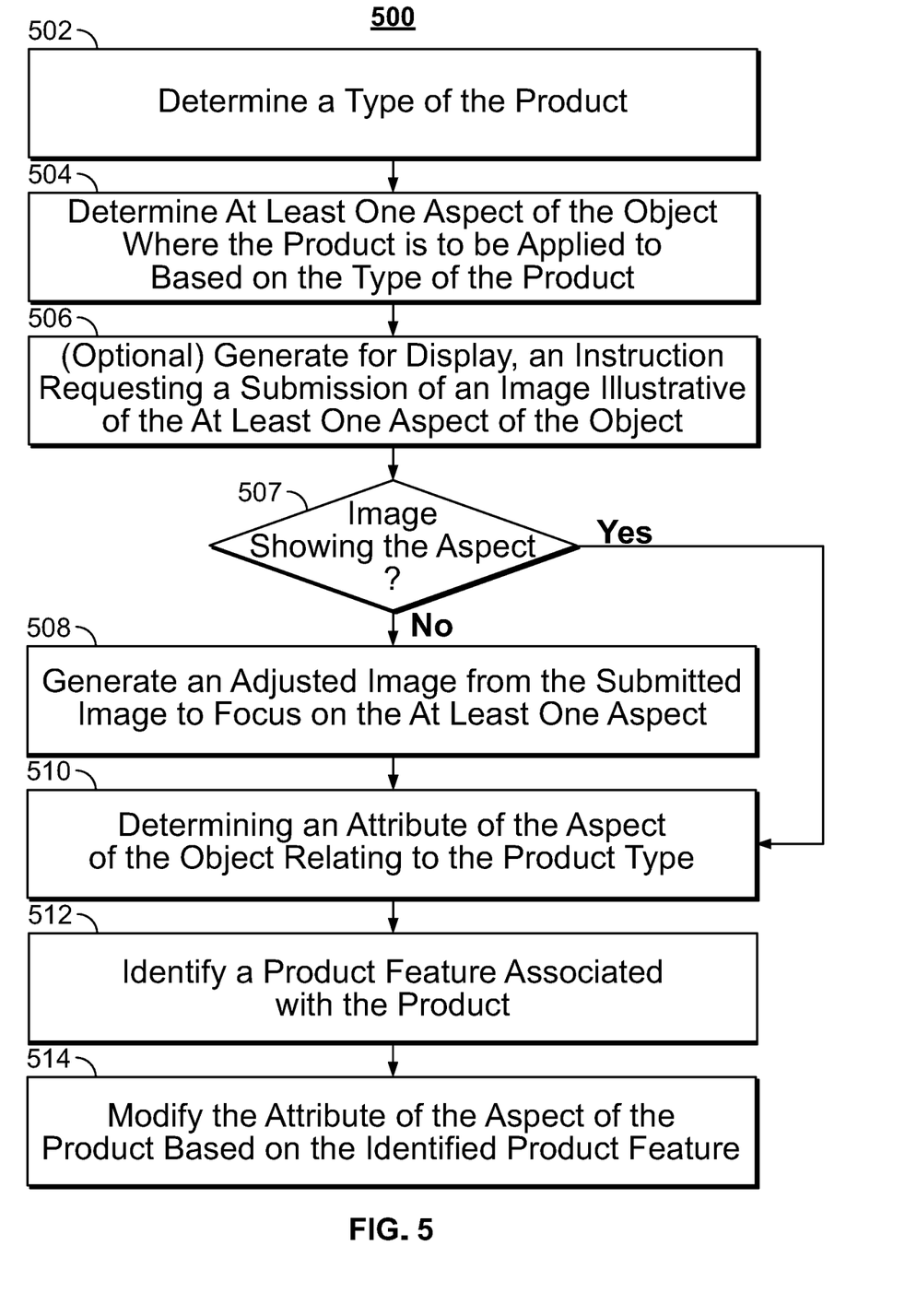
FIG. 5 depicts an illustrative flowchart of a process for generating a simulated visualization of a virtual try-on of a product, in accordance with some embodiments of the disclosure.

At 406, control circuitry generates a simulated visualization (e.g., 112 in FIG. 1) illustrating the product being applied on the subject, the process of which is further illustrated in FIG. 5.

At 408, control circuitry identifies a product feature in the simulated visualization of the product. For example, control circuitry receives the product feature (e.g., 202 in FIG. 3) as a structural data attribute from a product database 219. For another example, control circuitry analyzes image content and metadata of the simulated visualization to determine whether an attribute of one or more pixels has been altered. If attributes (e.g., color code) relating to a set of pixels have been modified, control circuitry determines that the modified attribute such as a changed color is related to a product feature.

At 410, control circuitry detects an interaction with the simulated visualization illustrating a product feature of the product. For example, control circuitry receives signals representing a fingertip movement from sensors on a touch screen of user equipment 114 to detect an interaction from the subject 102, e.g., to move a portion of the simulated visualization to the center, or to enlarge the portion of the simulated visualization to the center, and/or the like. Control circuitry further receives signals detected by a gyroscope and/or an accelerometer equipped with the user equipment indicative of a movement of user equipment, e.g., to move or position the user equipment by the subject to view the displayed simulated visualization at a certain angle, etc. Further detail relating to detecting the interaction with the simulated visualization is described in FIG. 6.

At 412, control circuitry captures at least one form of bio-feedback from the subject 102, based on which control circuitry determines an emotion indicator at 414. For another example, control circuitry receives signals representing image data of the eye area of the subject 102, from a camera on user equipment 114. Control circuitry then determines, from the image data of the eye area of the subject 102, a line of sight or focal point of the subject to determine which portion of the simulated visualization the subject 102 is paying attention to. Further detail relating to capturing bio-feedback are further described in FIG. 7.

At 416, control circuitry determines whether the emotion indicator from step 414 is positive. If the emotion indicator is positive, process 400 proceed with 418, where control circuitry generates a recommendation for another product having the same product feature that the subject is paying attention to. For example, control circuitry transmits a query based on the product feature (such as the lip color "coral" in FIG. 1) to the product databases (e.g., 219 in FIG. 3), and receives a product recommendation having the same product feature. If the emotion indicator is negative, process 400 proceed with 420, where control circuitry stores the at least one product feature as a non-preference for product recommendations, and restricts a recommendation of another product having the non-preferred product feature at 422.

FIG. 5 depicts an illustrative flowchart of a process for generating a simulated visualization of a virtual try-on of a product (406 in FIG. 4), in accordance with some embodiments of the disclosure.

Process 500 begins at 502, where control circuitry determines a type of the product. For example, control circuitry obtains product information from the product database 219 in FIG. 3, which includes a product type attribute such as beauty, electronics, apparel, house supplies, and/or the like. At 504, control circuitry determines at least one aspect of the subject where the product is to be applied to based on the type of the product. For example, control circuitry obtains application information relating to the product type from the product database, e.g., beauty products are applied to the facial area of a human body, house supplies are applied to an indoor setting, apparels area applied to a human body, and/or the like. At 506, upon identifying where the product is to be applied, control circuitry may optionally generate for display, e.g., at a user interface on user equipment 114, an instruction requesting a submission of an image illustrative of the at least one aspect of the subject. For example, for beauty products such as "Revlon Coral" 113 shown in FIG. 1, control circuitry instructs a front camera equipment 114 to capture a photo that focuses on the face of subject 112.

At 507, control circuitry determines whether the submitted image shows the aspect of the subject at which the product is to be applied. If the submitted image does not focus on the aspect of the subject, e.g., an image of a full human body is received, process 500 moves to 508, where control circuitry generates an adjusted image from the submitted image to focus on the at least one aspect. For example, control circuitry crops the submitted image of the full human body into a head shot that concentrates on the facial area. When the submitted image focuses on the aspect of the subject at 507, or after adjustment at 508, process 500 moves to 510, where control circuitry determines an attribute of the aspect of the subject relating to the product type. For example, as shown in FIG. 1, for beauty products such as a lipstick "Revlon Coral" 113, control circuitry has identified that the product is to be applied on the lip area on a human face from step 504, and may then identify, through pattern recognition and edge detection, the lip area (e.g., 116 in FIG. 1) on the image of the subject. Control circuitry also determines the color attributes, e.g., the red, green, blue (RGB) parameters of pixels belonging to the lip area, which are to be modified by color attributes of the product.

At 512, control circuitry identifies a product feature associated with the product, e.g., received at 202 from a product databases 219. At 514, control circuitry modifies the attribute of the aspect of the product based on the identified product feature. For example, control circuitry modifies the RGB parameters of pixels belonging to the lip area with a set of new RGB parameters that reflect the lipstick color of "Revlon Coral" 113 to generate the simulated visualization (e.g., 112 in FIG. 1).

Figure 6:
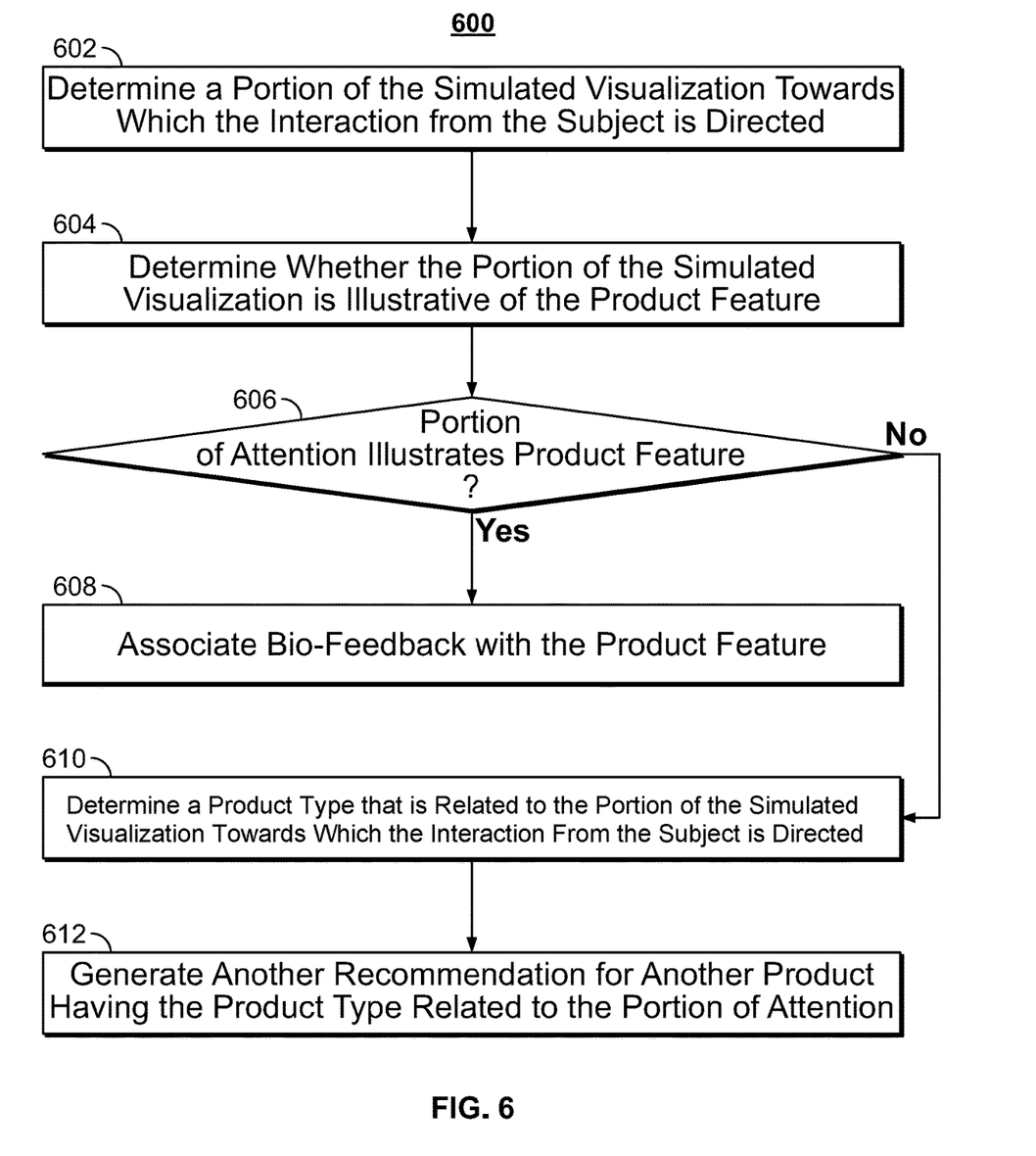
FIG. 6 depicts an illustrative flowchart of a process for detecting an interaction with the simulated visualization illustrating a product feature of the product, in accordance with some embodiments of the disclosure.

FIG. 6 depicts an illustrative flowchart of a process for detecting an interaction with the simulated visualization illustrating a product feature of the product (410 in FIG. 4), in accordance with some embodiments of the disclosure.

At 602, control circuitry determines a portion of the simulated visualization towards which the interaction from the subject is directed. For example, control circuitry determines, via signals from sensors on the touch screen of user equipment 114, that the portion of the simulated visualization has been moved to the center of the screen, or has been enlarged for detailed view.

At 606, control circuitry determines whether the portion of the simulated visualization is illustrative of the product feature. For example, control circuitry determines whether the portion that the subject 102 is paying attention to has been modified by the product feature. In the example shown in FIG. 1, the lip area 116 has been modified by the product feature, e.g., the lipstick color "coral." When the portion of the simulated visualization is illustrative of the product feature, process 600 proceeds with 608, where control circuitry associates any bio-feedback (obtained at 412 in FIG. 4) with the product feature.

At 606, when the portion of the simulated visualization that the subject is paying attention to is not illustrative of the product feature (e.g., the line of sight 119 or a zoom-in action may be directed to the forehead area in 112), process 600 moves on to 610, where control circuitry determines a product type that is related to the portion of the simulated visualization towards which the interaction from the subject is directed. For example, when the lines of sight 119 is directed to the forehead area, control circuitry transmits a query, based on the portion "forehead," to the product database (219 in FIG. 3) for a product relating to the area "forehead." At 612, control circuitry generates a recommendation for a product having the product type related to the portion that the subject is paying attention to. For example, control circuitry receives, in response to the query, and in turn generates a recommendation of a blemish concealer, a contouring stick, a highlighter, and/or the like that is related to the area "forehead." In this way, by detecting interactions with the simulated visualization, control circuitry can assist a subject (102 in FIG. 1) to virtually try on more products based on the attention and interest of the subject.

Figure 7:
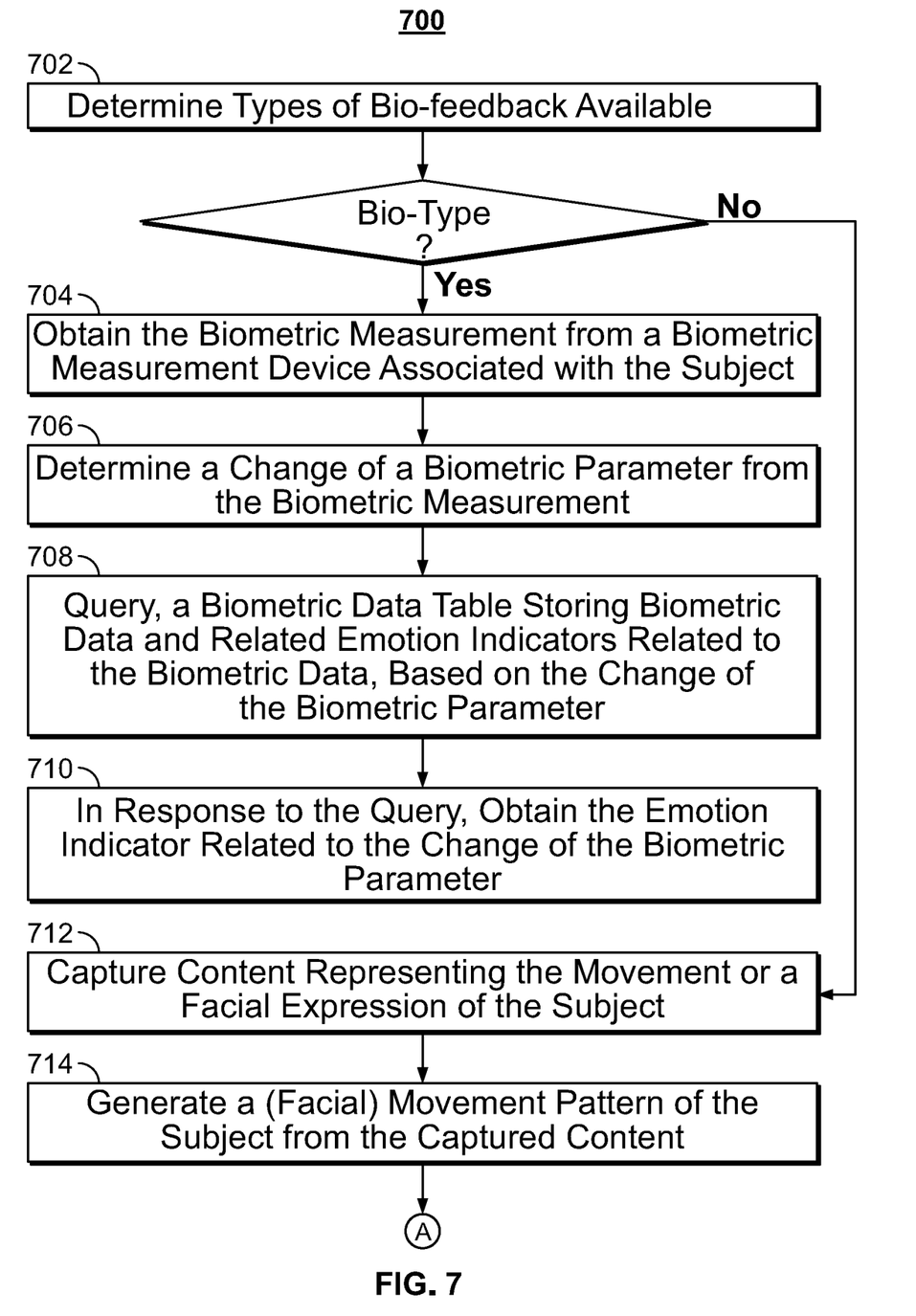
FIG. 7 depicts an illustrative flowchart of a process for capturing bio-feedback and determining an emotion indicator from the bio-feedback, in accordance with some embodiments of the disclosure.

FIG. 7 depicts an illustrative flowchart of a process for capturing bio-feedback and determining an emotion indicator from the bio-feedback (412-414 in FIG. 4), in accordance with some embodiments of the disclosure.

Process 700 begins at 702, where control circuitry determines types of bio-feedback that is available. For example, control circuitry at user equipment (114 in FIG. 1) queries a local hardware inventory to determine sensors that are equipped with the user equipment, such as a camera to capture imagery of the subject, an audio recorder to record an utterance of the subject, a gyroscope and/or accelerometer to capture movement of the subject, and/or the like. For another example, control circuitry at user equipment determines whether a wearable device (e.g., an electronic wrist band, a headset, and/or the like) is paired with user equipment, and then receives biometric measurement data from the wearable device, such as pulse rate, heart rate, blood pressure, EEG wave, body temperature, and/or the like.

When biometric measurement data is available, process 700 proceeds with 704, where control circuitry obtains the biometric measurement from a biometric measurement device such as a wearable device described above, associated with the subject. At 706, control circuitry determines a change of a biometric parameter from the biometric measurement. For example, control circuitry determines an increased pulse rate, a heightened blood pressure, increased EEG activities, and/or the like. At 708, control circuitry transmits a query based on the change of biometric measurement, to a biometric data table. The biometric data table may be stored locally at user equipment (114 in FIG. 1), or may be stored at a cloud storage that is remote to the user equipment but accessible via a communication network. The biometric data table stores biometric data and related emotion indicators related to the biometric data. For example, a data entry in the biometric data table may specify a range of pulse rate and an associated emotional state as "excitement."

At 710, in response to the query, control circuitry obtains an emotion indicator related to the change of the biometric parameter. For example, when the changed pulse rate falls within a range of pulse rate specified in the biometric data table, the query result reflects the corresponding emotional state from the data table.

At 702, when no biometric measurement is available, process 700 moves to 712, where control circuitry captures content representing the movement or a facial expression of the subject. For example, the content may be video content captured by a camera on the user equipment. For another example, the content may be a movement pattern captured by a gyroscope and/or accelerometer on the user equipment. At 704, control circuitry generates a movement pattern of the subject from the captured content. For example, when the content includes video content of a facial expression of the subject, control circuitry performs pattern recognition on the captured video or image content to identify the position of eyes, the lip and nose of the facial area, and generate a facial expression. For another example, control circuitry obtains a movement trajectory or position change detected by the accelerometer and/or gyroscope.

At 716, control circuitry transmits a query based on the movement pattern, to a movement database to identify the movement. The movement database may be stored locally at user equipment (114 in FIG. 1), or may be stored at a cloud storage that is remote to the user equipment but accessible via a communication network. The movement database stores a movement pattern and related emotion indicators related to the movement pattern. For example, a facial expression pattern having an upwardly arched lip and wrinkled nose is identified as a "smile," which is related to emotion indicators "happy," "satisfied," and/or the like from the movement database. For another example, a movement trajectory containing a suddenly elevated height is identified as a "jump," which is related to emotion indicators "excited," "joyful" from the movement database.

Process 700 may also optionally move to 718, where control circuitry determines whether audio content is available from the content captured at 712. If no audio content is available, process 700 proceeds to 730. If audio content is available, process 700 proceeds to 720, where control circuitry determines whether the audio content includes a verbal expression from the subject, e.g., by speech detection. At 722, when no verbal expression is detected, control circuitry generates a tone pattern from the vocal expression. At 724, when verbal expression is detected, control circuitry identifies words from the verbal expression via speech detection, and may also optionally generate a tone pattern from the vocal expression at 722. Process 700 proceeds from 722 and 724 to 726, where control circuitry queries an emotion database based on the identified words and tone pattern. The emotion database may be stored locally at user equipment (114 in FIG. 1), or may be stored at a cloud storage that is remote to the user equipment but accessible via a communication network. The emotion database stores verbal expressions such as words, phrases, idioms, tone patterns, and/or the like and the corresponding emotion indicators. For example, a verbal expression "looks great" with an acclaiming tone (e.g., 117 in FIG. 1) may be mapped to emotion indicators "happy," "excited" from the emotion database.

At 730, in response to the queries, control circuitry obtains the emotion indicator associated with the bio-feedback. In some embodiments, control circuitry collects and aggregates one or more different forms of bio-feedback such as facial expression, verbal expression and biometric measurement to identify an emotion indicator. For example, steps 704-710 and steps 712-726 may be implemented simultaneously or in parallel to aggregate the identified emotion indicators at 730 from different form of bio-feedback. In some embodiments, control circuitry may prioritize one form of bio-feedback over another to identify an emotion indicator. For example, when a camera is available on user equipment, control circuitry prioritizes a captured facial expression as the primary source to determine the emotion indicator. For another example, when a verbal expression is captured by user equipment, control circuitry prioritizes the captured verbal expression as the primary source to determine the emotion indicator.

It is contemplated that the actions or descriptions of each of FIGS. 4-7 may be used with any other embodiment of this disclosure. In addition, the actions and descriptions described in relation to FIGS. 4-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the actions in FIGS. 4-7.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry. The processing circuitry, for instance, may be a general-purpose processor, a customized integrated circuit (e.g., an ASIC), or a field-programmable gate array (FPGA) within the content construction engine or the media destruction engine described through the disclosure.

Furthermore, processing circuitry, or a computer program, may update configuration data of the recommendation engine, which may be stored at a storage within the user equipment 114.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for generating a recommendation based on bio-feedback, the method comprising:

receiving product information about a first product comprising a plurality of product features;
detecting an interaction with a simulated visualization associated with the first product;
upon detecting the interaction:
    capturing, via a plurality of sensors, a plurality of forms of bio-feedback data from a subject associated with the simulated visualization; and
    determining, based on the detected interaction, at least one form from the plurality of forms of bio-feedback data that is associated with the detected interaction and the simulated visualization;
determining an emotion indicator, wherein the emotion indicator is based on the at least one form of bio-feedback data;
identifying, in the simulated visualization associated with the first product, a product feature of the plurality of product features of the first product based on (i) the at least one form of bio-feedback data and (ii) the detected interaction with the simulated visualization; and
in response to determining, based on the at least one form of bio-feedback data, that the emotion indicator is positive towards the identified product feature:
    identifying, based on the identified product feature, a second product comprising the identified product feature; and
    generating a recommendation for the second product comprising the identified product feature.

2. The method of claim 1, further comprising:
in response to determining, based on the at least one form of bio-feedback data, that the emotion indicator is negative:
    storing the identified product feature as a non-preference for product recommendations; and
    restricting a recommendation of the second product comprising the identified product feature.

3. The method of claim 1, further comprising:
receiving, from the subject, a selection of the first product comprising the plurality of product features, wherein the first product is to be applied on the subject;
determining a type of the first product;
determining at least one aspect of the subject where the first product is to be applied based on the type of the first product;
generating for display, an instruction requesting a submission of an image illustrative of the at least one aspect of the subject; and
generating the simulated visualization associated with the first product with the image of the subject by:
    determining an attribute of the at least one aspect of the subject shown in the image, wherein the attribute is related to the identified product feature; and
    modifying the attribute of the at least one aspect of the first product based on the identified product feature.

4. The method of claim 1, wherein the detecting the interaction with the simulated visualization associated with the first product comprises:
receiving an input indicative of a modification to the simulated visualization; and
determining whether the input modifies the identified product feature in the simulated visualization; and
the method further comprises:
    in response to determining that the input modifies the identified product feature in the simulated visualization, storing the modified identified product feature as a preferred product feature.

5. The method of claim 1, wherein the detecting the interaction with the simulated visualization associated with the first product comprises:
determining that the interaction with the simulated visualization is from the subject;
determining a portion of the simulated visualization towards which the interaction from the subject is directed;
determining whether the portion of the simulated visualization is illustrative of the identified product feature; and
the method further comprises:
    in response to determining that the portion of the simulated visualization is illustrative of the identified product feature, associating the at least one form of bio-feedback data with the identified product feature.

6. The method of claim 1, wherein the plurality of forms of bio-feedback data comprises a biometric measurement, and
wherein the capturing the plurality of forms of bio-feedback data from the subject comprises obtaining the biometric measurement from a biometric measurement device associated with the subject, the biometric measurement being selected from a group of blood pressure, pulse rate, pupil dilation, and focal point; and
wherein the determining the emotion indicator based on the at least one captured form of bio-feedback data comprises:
    determining a change of a biometric parameter from the biometric measurement;
    querying, a biometric data table storing biometric data and related emotion indicators related to the biometric data, based on the change of the biometric parameter;
    in response to the query, obtaining the emotion indicator related to the change of the biometric parameter.

7. The method of claim 1, wherein the plurality of forms of bio-feedback data comprises a movement of the subject; and
wherein the capturing the plurality of forms of bio-feedback data from the subject comprises capturing content representing the movement of the subject; and
wherein the determining the emotion indicator based on the at least one form of bio-feedback data comprises:
    generating a movement pattern of the subject from the captured content;
    querying, a movement database, based on the generated movement pattern to identify the movement;
    in response to the query, obtaining the emotion indicator associated with the identified movement.

8. The method of claim 1, wherein the identifying the product feature of the plurality of product features of the first product in the simulated visualization associated with the first product comprises:
obtaining the simulated visualization of the first product;
retrieving a content structure associated with the simulated visualization associated with the first product,
    wherein the content structure comprises structural data attributes indicative of the subject that the first product is to be applied;
determining whether a structural data attribute from the structural data attributes has been modified based on metadata associated with the simulated visualization; and
in response to determining that the structural data attribute from the listing of structural data attributes has been modified, determining a change in the structural data attribute that is indicative of the identified product feature associated with the first product.

9. The method of claim 1, further comprising:
receiving a video of the subject;
determining, based on the video of the subject, a plurality of video frames showing an area related to the first product and the identified product feature;
modifying each of the plurality of video frames based on the identified product feature and the area; and
generating for display a simulated dynamic view of the identified product feature, wherein the simulated dynamic view comprises the plurality of modified video frames.

10. The method of claim 1, wherein the determining the at least one form of bio-feedback data from the plurality of forms of bio-feedback data comprises:
determining, from the at least one form of bio-feedback data, a highest priority form of bio-feedback data;
wherein the emotion indicator is determined based on at least the highest priority form of bio-feedback data; and
wherein the product feature is identified based on at least the highest priority form of bio-feedback data.

11. A system for generating a recommendation based on bio-feedback, the system comprising:
a user interface comprising one or more sensors configured to capture bio-feedback data; and
control circuitry configured to:
receive product information about a first product comprising a plurality of product features;
detect, via the user interface, an interaction with the simulated visualization associated with the first product;
upon detecting the interaction:
capture, via a plurality of sensors, a plurality of forms of bio-feedback data from a subject associated with the simulated visualization; and
determine, based on the detected interaction, at least one form from the plurality of forms of bio-feedback data that is associated with the detected interaction and the simulated visualization;
determine an emotion indicator, wherein the emotion indicator is based on the at least one form of bio-feedback data;
identify, in the simulated visualization associated with the first product, a product feature of the plurality of product features of the first product based on (i) the at least one form of bio-feedback data and (ii) the detected interaction with the simulated visualization; and
in response to determining, based on the at least one form of bio-feedback data, that the emotion indicator is positive towards the identified product feature:
identify, based on the identified product feature, a second product comprising the identified product feature; and
generate a recommendation for the second product comprising the identified product feature.

12. The system of claim 11, wherein the control circuitry is further configured to:
in response to determining, based on the at least one form of bio-feedback data, that the emotion indicator is negative:
store the at least one identified product feature as a non-preference for product recommendations; and
restrict a recommendation of the second product comprising the identified product feature.

13. The system of claim 11, wherein the control circuitry is further configured to:
receive, from the subject, a selection of the first product comprising the plurality of product features, wherein the first product is to be applied on the subject;
determine a type of the first product;
determine at least one aspect of the subject where the first product is to be applied based on the type of the first product; and
generate for display, an instruction requesting a submission of an image illustrative of the at least one aspect of the subject;
generate the simulated visualization associated with the first product with the image of the subject by:
determining an attribute of the at least one aspect of the subject shown in the image, wherein the attribute is related to the identified product feature; and
modifying the attribute of the at least one aspect of the first product based on the identified product feature.

14. The system of claim 11, wherein the control circuitry is further configured, when detecting the interaction with the simulated visualization associated with the first product, to:
receive an input indicative of a modification to the simulated visualization; and
determine whether the input modifies the identified product feature in the simulated visualization; and
in response to determining that the input modifies the identified product feature in the simulated visualization, store the modified identified product feature as a preferred product feature.

15. The system of claim 11, wherein the control circuitry is further configured, when detecting the interaction with the simulated visualization associated with the first product, to:
determine that the interaction with the simulated visualization is from the subject;
determine a portion of the simulated visualization towards which the interaction from the subject is directed;
determine whether the portion of the simulated visualization is illustrative of the identified product feature; and
in response to determining that the portion of the simulated visualization is illustrative of the identified product feature, associate the at least one form of bio-feedback data with the identified product feature.

16. The system of claim 11, wherein the plurality of forms of bio-feedback data comprises a biometric measurement, and
wherein the control circuitry is further configured to:
obtain the biometric measurement from a biometric measurement device associated with the subject, the biometric measurement being selected from a group of blood pressure, pulse rate, pupil dilation, and focal point;
determine a change of a biometric parameter from the biometric measurement;
query, a biometric data table storing biometric data and related emotion indicators related to the biometric data, based on the change of the biometric parameter; and
in response to the query, obtain the emotion indicator related to the change of the biometric parameter.

17. The system of claim 11, wherein the plurality of forms of bio-feedback data comprises a movement of the subject; and
wherein the control circuitry is further configured to:
capture content representing the movement of the subject;

generate a movement pattern of the subject from the captured content;

query, a movement database, based on the generated movement pattern to identify the movement; and in response to the query, obtain the emotion indicator associated with the identified movement.

18. The system of claim 11, wherein the control circuitry is further configured, when identifying the product feature of the plurality of product features of the first product in the simulated visualization associated with the first product, to:

obtain the simulated visualization of the first product;

retrieve a content structure associated with the simulated visualization associated with the first product,
  wherein the content structure comprises structural data attributes indicative of the subject that the first product is to be applied;

determine whether a structural data attribute from the structural data attributes has been modified based on metadata associated with the simulated visualization; and in response to determining that the structural data attribute from the listing of structural data attributes has been modified, determine a change in the structural data attribute that is indicative of the identified product feature associated with the first product.

19. The system of claim 11, wherein the control circuitry is further configured to:

receive a video comprising the subject;

determine, based on the video of the subject, a plurality of video frames showing an area related to the first product and the identified product feature;

modify each of the plurality of video frames based on the identified product feature and the area; and generate for display a simulated dynamic view of the identified product feature, wherein the simulated dynamic view comprises the plurality of modified video frames.

20. The system of claim 11, wherein the control circuitry is further configured to:

determine, from the at least one form of bio-feedback data, a highest priority form of bio-feedback data;

determine the emotion indicator based on at least the highest priority form of bio-feedback data; and identify the product feature based on at least the highest priority form of bio-feedback data.

\* \* \* \* \*